Aug. 24, 1926.
J. A. DIENNER
1,597,067
CONTROL MEANS FOR SHAFTS AND THE LIKE
Filed Dec. 17, 1924  2 Sheets-Sheet 1
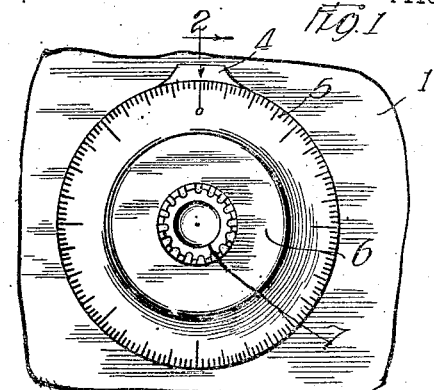
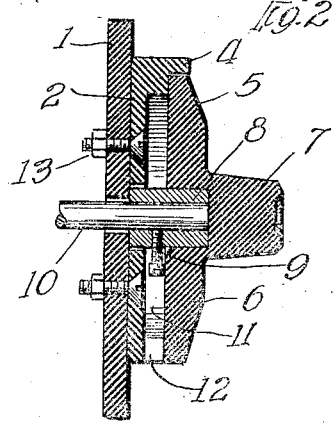
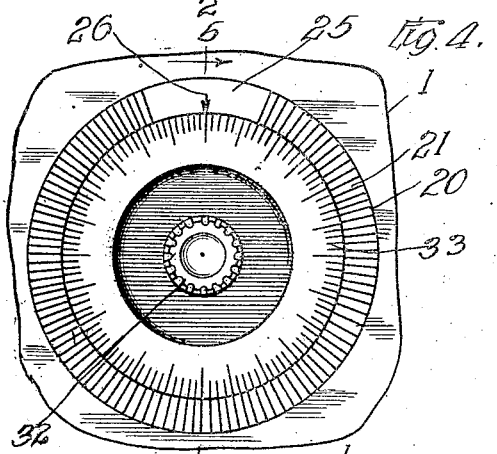
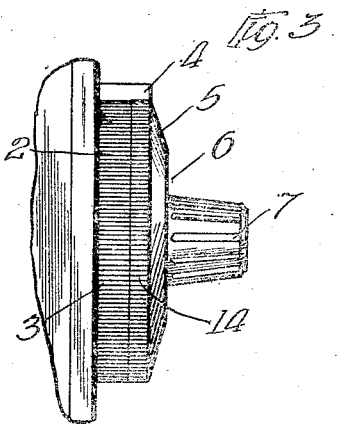
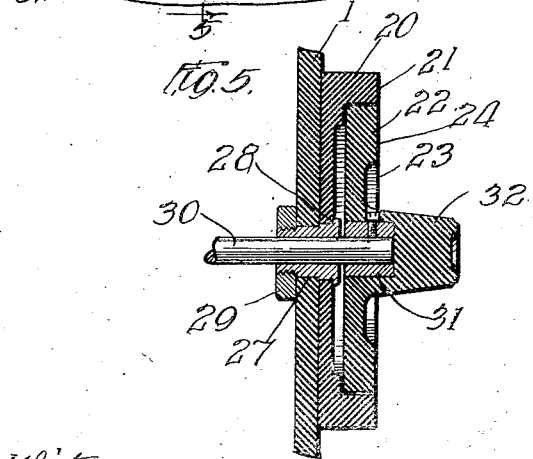
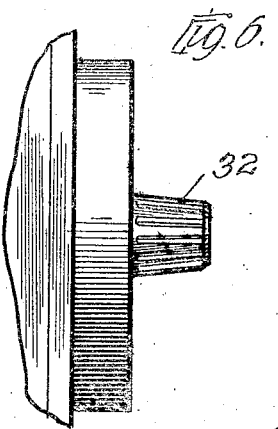
Witnesses:
Harry B. L. White
W. P. Kiley
Inventor:
John A. Dienner Aug. 24, 1926.　　　　　　　　　　　　　　　1,597,067
J. A. DIENNER
CONTROL MEANS FOR SHAFTS AND THE LIKE
Filed Dec. 17, 1924　　2 Sheets-Sheet 2
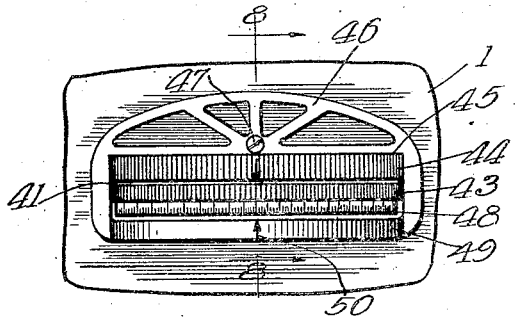
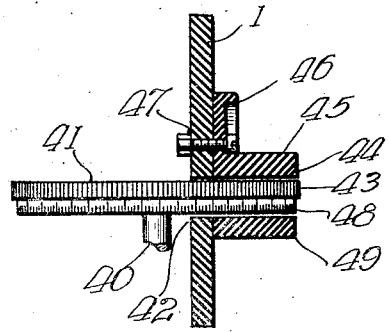
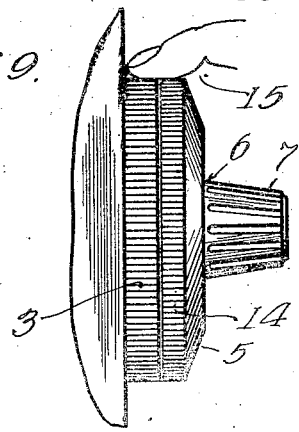
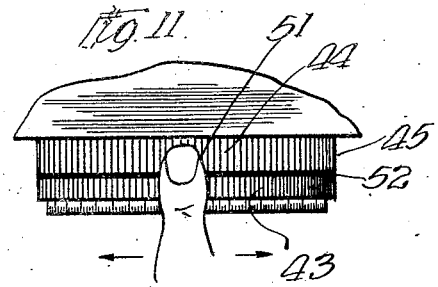
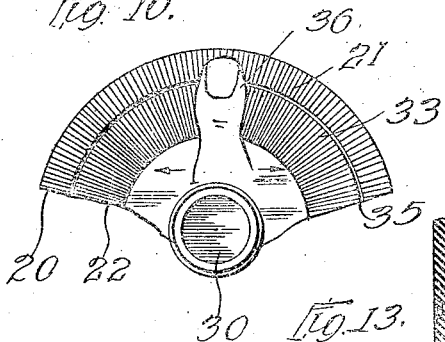
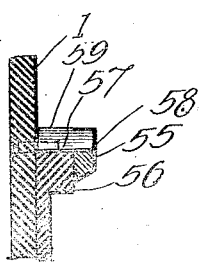
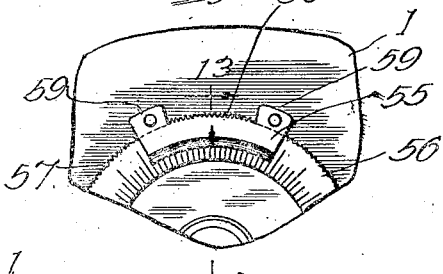
Witnesses:
Inventor
John A. Dienner
By Brown, Boettcher-Dienner
Attys Patented Aug. 24, 1926.

1,597,067

UNITED STATES PATENT OFFICE.

JOHN A. DIENNER, OF EVANSTON, ILLINOIS.

CONTROL MEANS FOR SHAFTS AND THE LIKE.

Application filed December 17, 1924. Serial No. 756,383.

My invention relates to control means for shafts and the like and more particularly is concerned with the matter of securing minute angular adjustment of a rotary or oscillatory member.

In adjusting the tuning elements of a radio set, it is desirable to set the rotary element at the approximate angular adjustment desired and then find the exact angular position by feeling for the same. This requires minute angular adjustment which should be under complete control and free from lost motion. Such adjusting mechanism is often termed vernier mechanism. Such vernier mechanism should be adaptable for use anywhere on the dial, that is, at any angular position.

According to the present invention, I provide a stationary element or abutment closely adjacent the dial element. These two elements are so constructed and positioned with respect to each other that they have surfaces which are flush with each other, forming practically a common continuous surface which may be plain, cylindrical, conical, spherical, or otherwise formed. The surfaces of the two elements are separated, however, by a gap or dividing line. Preferably, these surfaces are roughened, as by means of parallel or radial lines, although knurling, or the like, may be employed instead, or the surfaces may be left plain so long as they provide suitable friction with the third element. Then, by means of a third element, which may be the finger or thumb of the operator, I connect the two elements by frictional engagement with said third element and rock or swing the third element so as to impart a slight movement to the movable element. Due to the frictional contact of the third element with the other two elements, control of the movable element is at all times had and no lost motion is possible. The effect of the third element is that of a lever pivoted to each of the other two elements and movable in either direction at the will of the operator at a variable radius. The effect of a variable or adjustable radius is secured by the distribution and location of pressure of the third element upon the surfaces of the other two elements. The third element should be relatively soft and yielding and should afford fairly good frictional engagement with the first two elements. The operator's finger is ideal, but a piece of rubber, or the like, may be used if so desired.

This structure and its mode of operation is of the greatest simplicity and effectiveness.

Now, in order to acquaint those skilled in the art with one manner of constructing and operating my device, I shall describe in connection with the accompanying drawings, a specific embodiment of the invention.

In the drawings:—

Figure 1 is a front elevational view of a device embodying the invention;

Fig. is a cross sectional view of the same;

Fig. 3 is a side elevational view taken from the left of Fig. 1;

Fig. 4 is a front elevational view of a modified form of the device;

Fig. 5 is a cross section taken on the line 5—5 of Fig. 4;

Fig. 6 is a side elevational view of the same;

Fig. 7 is a face view of another modification;

Fig. 8 is a cross sectional view of the same taken on the line 8—8 of Fig. 7;

Figs. 9, 10 and 11 are views illustrating the manner of use of the three forms previously described;

Fig. 12 is a fragmentary face view of a modified form of the device; and

Fig. 13 is a sectional view taken on the line 13—13 of Fig. 12.

As shown in the drawings, I provide a panel 1 upon the front of which is mounted the stationary abutment member 2, this abutment member having a cylindrical surface 3, indicated more clearly in Fig. 3, which is corrugated or roughened by parallel lines, so as to form a convenient frictional contact with the finger of the operator. At its upper edge, the abutment member 2 has an overhanging projection 4, which serves as an index or reference point for the graduations 5 which appear on the beveled face of the dial member 6. The dial member 6 has a central knob 7 formed integral therewith, and a metallic insert 8 has a set screw 9 for fastening the dial upon the shaft 10. This shaft 10 is connected to a tuning element, that is, a coil, condenser, or the like, which it is desired to adjust as to angular position.

The abutment member 2 is recessed, as indicated at 11, between the dial 6 and the central portion of said abutment member 2, and room is thereby provided for the set screw 9 which may be reached for adjustment through the opening 12 formed in the lower part of the abutment member 2. The abutment member 2 is held to the panel 1, as by means of the bolt 13. Obviously a thimble or other attaching means might be employed instead.

The dial 6 has a cylindrical surface 14 which forms in effect a continuation of the cylindrical surface 3, and it likewise is roughened as by means of parallel lines, preferably of a different pitch from the pitch of the lines on the cylindrical surface 3 of the abutment member 2.

The manner of use is indicated in Fig. 9. The dial 6 is turned to any desired position by means of the knob 7 and then the finger of the operator, indicated at 15, is applied to both of the cylindrical surfaces, pressure being applied to the desired degree to obtain friction with each of said surfaces 3 and 14, and then the finger is rocked sidewise so as to secure a leverage action between the surfaces 3 and 14. Thereby an adjustment of extremely small extent may be secured and may be accurately held at any position. Obviously instead of the finger of the operator, a third element of equivalent effect might be employed, for example, a piece of india rubber, or the like. By spreading the pressure over a greater distance longitudinally of the cylindrical surfaces 3 and 14, a greater degree of motion may be obtained and likewise the degree of motion which is secured may be controlled by the extent of movement of the finger.

In Figs. 4, 5 and 6, I have illustrated a modification in which the co-operating surfaces of the abutment member and the dial member are in the same plane. That is to say, a flat surface is provided instead of a cylindrical surface. In this embodiment the abutment member 20 provides a plane surface 21 which forms the radial face of a cylindrical body of insulation of which said abutment is formed. The abutment member 20 is recessed to receive the disc 22 of the dial member 23. The disc portion 22 has a plane surface lying in substantially the same plane as the surface 21. The disc 22 of the dial 23 is recessed into the abutment member 20, so that the two surfaces 21 and 24 are substantially flush. The surface 21 is roughened by means of radial lines extending through substantially the entire periphery, leaving only the portion 25 plain, the zero indication 26 being placed upon the plain portion.

The abutment 20, being recessed as indicated in Fig. 5, permits mounting of the same by means of the thimble 27, which extends through an opening in the panel 1, the thimble 27 having a head 28 which engages the central part of the abutment member 20 and clamps it to said panel 1. The thimble 27 in turn has a nut 29 threaded upon the inside thereof. This thimble forms a bearing for the shaft 30 and keeps the parts 20 and 22 in alignment.

The shaft 30 is secured to the dial member 23 through the use of an insert 31 which is molded in the dial member 23. A suitable finger piece or knob 32 is formed at the central part of the dial member 23 and this is knurled or fluted so as to be readily grasped between the thumb and fingers.

The radial face of the disc 22 bears graduations 33 which graduations are cut deep enough so as to form a suitable friction surface for engagement by the fingers or thumb of the operator.

The mode of operation of the device shown in Figs. 4, 5 and 6 is illustrated in Fig. 10. The thumb of the operator is placed across the gap 35 between the elements 20 and 22 so as to connect the two elements. The surface roughening or corrugations provide frictional contact between the operator's thumb and the respective element. The thumb is then moved back and forth, as indicated by the arrows in Fig. 10, to give the necessary adjustment to the movable member 22 about its shaft 30. The degree of movement and the ratio of movement may be controlled by properly distributing the pressure of the thumb 36 upon the surfaces 21 and 33, so as to secure a greater or less leverage and to secure the desire movement.

In Figs. 7 and 8, I have illustrated another embodiment of the invention in which the shaft 40 is mounted in a vertical position so as to bring the controlling wheel or dial 41 to lie in the horizontal plane and extend out through a slot 42 in the panel 1. The dial 41 comprises a horizontal disc or short cylinder having a cylindrical surface 43 which is adapted to lie in a position to be flush with the surface 44 of the abutment member 45, which abutment member is secured by an ornamental escutcheon or plate 46 to the front of the panel 1. This escutcheon may be held as by means of suitable screws, such as indicated at 47, for clamping the same to the panel 1. The disc or dial 41, in addition to the roughened working surface, has a surface of slightly less diameter at 48 upon which indications of angular position are placed. Adjacent this part of the dial or disc 41, I place a co-operating projection 49 which is preferably formed with a cylindrical surface of about the same configuration as the surface 48, this projection bearing an indication at 50 for indicating the angular position of the dial 41. If desired, the disc 41 may have the same diameter throughout and the angular graduations may serve as the roughening lines for providing the necessary friction between the thumb of the operator and said disc. The disc is adjusted in angular position by placing the thumb or finger upon the roughened surface 43 only and rotating the shaft 40 to the desired general position, whereupon the final angular position may be secured as indicated in Fig. 11. The thumb 51 of the operator, being placed upon the two surfaces 43 and 44 and bridging the gap 52 between them, is then rocked to and fro as indicated in Fig. 11 by the arrows so as to secure the desired angular adjustment.

In Figs. 12 and 13 I have indicated a modification in which a bracket member 55 extends out from the panel 1 over the rim of the dial 56, this dial 56 having a roughened cylindrical surface 57 and the bracket having a cooperating flush surface 58 formed between the lugs 59. These lugs 59 are secured directly to the panel 1. The finger of the operator may then be rested upon said surface 58, which is a part of the bridge between the lugs 59. These surfaces 57—58 may be conical surfaces flush with each other. When the finger of the operator engages the surfaces 57 and 58, it bridges the gap between these members, and by rocking the finger, as heretofore explained, the desired angular adjustment of the movable element 56 may be secured.

While I have shown only cylindrical and plane surfaces, I wish it to be understood that any other surface of revolution, such as a cone, a sphere, etc., may be employed.

Obviously instead of the finger or thumb of the operator, a third element may be employed for connecting the stationary or abutment element and the movable or disc element. I find, however, that the finger is sensitive to very small changes and the control over the adjustment is better where the same can be actually felt.

I do not intend to be limited to the details shown or described.

I claim:—

1. In combination, a stationary element, an adjacent angular adjustable element, said elements having surfaces formed substantially flush, said surfaces being roughened to be engaged by the finger of the operator for securing minute angular adjustment of said movable element.

2. In combination, a panel, a dial adjacent thereto, an abutment member secured to the dial, said member having a surface substantially flush with the adjacent surface of the dial, said surfaces being adapted to be engaged by a third element for angular adjustment of the dial with respect to the abutment.

3. In combination, a panel, an abutment member comprising a substantially cylindrical disc, an axial recess in the disc, a dial having a cylindrical surface flush with the cylindrical surface of said abutment member, and an axially projecting knob on the dial member for major angular adjustment of said dial member.

4. In combination, a panel, an abutment member secured thereto, said abutment member comprising a disc having an axial recess, a dial member having a cylindrical surface substantially flush with the cylindrical surface of said abutment member, said cylindrical surface being adapted to be engaged by the finger of the operator, a metallic sleeve secured on the back side of the dial and extending into said recess, a shaft secured in said sleeve and fastening means for connecting the shaft and the sleeve lying in said recess.

5. In combination, an abutment member comprising a disc having a cylindrical surface and having an axial recess, a dial having a cylindrical surface flush with the cylindrical surface of said disc and having a central knob, a sleeve in the dial and extending into the axial recess, said sleeve having a clamping screw lying in said recess, and a radial opening through the disc for providing access to said screw.

6. In combination, a stationary abutment member having a cylindrical surface, a dial member having a cylindrical surface flush with said first cylindrical surface, a projection on said abutment member extending out over the cylindrical surface of the dial member and co-operating indicia on both of said members.

In witness whereof, I hereunto subscribe my name this 15th day of December, 1924.

JOHN A. DIENNER.